United States Patent
Pedersen

(10) Patent No.: US 8,321,773 B1
(45) Date of Patent: Nov. 27, 2012

(54) HARDWARE TRUE RANDOM NUMBER GENERATOR IN INTEGRATED CIRCUIT WITH TAMPER DETECTION

(75) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 1004 days.

(21) Appl. No.: 12/262,666

(22) Filed: Oct. 31, 2008

(51) Int. Cl.
*G06F 11/00* (2006.01)

(52) U.S. Cl. ............ 714/799; 714/790; 714/749

(58) Field of Classification Search .......... 714/799, 714/790, 749, 724, 751, 800; 708/255, 250
See application file for complete search history.

(56) References Cited

U.S. PATENT DOCUMENTS

| | | | | |
|---|---|---|---|---|
| 6,807,553 B2 * | 10/2004 | Oerlemans | .......... | 708/252 |
| 6,862,605 B2 * | 3/2005 | Wilber | .......... | 708/255 |
| 7,000,174 B2 * | 2/2006 | Mantha et al. | .......... | 714/790 |
| 7,356,751 B1 * | 4/2008 | Levitan | .......... | 714/748 |
| 7,502,815 B1 * | 3/2009 | Drimer | .......... | 708/255 |
| 7,587,439 B1 * | 9/2009 | Onufryk et al. | .......... | 708/250 |
| 2007/0288765 A1 | 12/2007 | Kean | | |
| 2008/0279373 A1 | 11/2008 | Erhart et al. | | |
| 2009/0276844 A1 | 11/2009 | Gehrmann et al. | | |

* cited by examiner

*Primary Examiner* — Fritz Alphonse
(74) *Attorney, Agent, or Firm* — Womble Carlyle Sandridge & Rice, LLP

(57) ABSTRACT

Circuits and methods to generate a True Random Number Generator (TRNG) with tamper-detection are presented. In one embodiment, the circuit includes two identical TRNG circuits and logic circuitry that combines and correlates the outputs of the two TRNG circuits. The two identical TRNG circuits are located in close proximity to each other inside an Integrated Circuit (IC). The logic circuitry analyzes the outputs of the two TRNG circuits and the historical values of the relation between the outputs of the two TRNG circuits to determine if the outputs are correlated. If the outputs are not correlated, the logic circuitry outputs a true random number sequence based on the combination of the two TRNG circuits. As a result, circuit tampering, such as changes in temperature or voltage supplies, is detected in the IC.

20 Claims, 5 Drawing Sheets a = b = 0

| a | b | c | d | e |
|---|---|---|---|---|
| 0 | 0 | 0 |   |   |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

Fig. 4A a = b = 1

| a | b | c | d | e |
|---|---|---|---|---|
| 1 | 1 | 0 |   |   |
| 1 | 1 | 0 | 0 | 0 |
| 1 | 1 | 0 | 0 | 0 |
| 1 | 1 | 0 | 0 | 0 |
| 1 | 1 | 0 | 0 | 0 |

Fig. 4B a = b

| a | b | c | d | e |
|---|---|---|---|---|
| 0 | 0 | 0 |   |   |
| 0 | 0 | 0 | 0 | 0 |
| 0 | 0 | 0 | 0 | 0 |
| 1 | 1 | 0 | 0 | 0 |
| 1 | 1 | 0 | 0 | 0 |
| 1 | 1 | 0 | 0 | 0 |
| 0 | 0 | 0 | 0 | 0 |

Fig. 4C a = not(b)

| a | b | c | d | e |
|---|---|---|---|---|
| 1 | 0 | 1 |   |   |
| 1 | 0 | 1 | 1 | 0 |
| 1 | 0 | 1 | 1 | 0 |
| 0 | 1 | 1 | 1 | 0 |
| 0 | 1 | 1 | 1 | 0 |
| 1 | 0 | 1 | 1 | 0 |
| 1 | 0 | 1 | 1 | 0 |

Fig. 4D a = 1, b = random

| a | b | c | d | e |
|---|---|---|---|---|
| 1 | 0 | 1 |   |   |
| 1 | 1 | 0 | 1 | 1 |
| 1 | 0 | 1 | 0 | 1 |
| 1 | 0 | 1 | 1 | 0 |
| 1 | 1 | 0 | 1 | 1 |
| 1 | 1 | 0 | 0 | 0 |
| 1 | 0 | 1 | 0 | 1 |

Fig. 4E a, b random

| a | b | c | d | e |
|---|---|---|---|---|
| 1 | 0 | 1 |   |   |
| 0 | 0 | 0 | 1 | 1 |
| 1 | 1 | 0 | 0 | 0 |
| 1 | 0 | 1 | 0 | 1 |
| 0 | 1 | 1 | 1 | 0 |
| 1 | 0 | 1 | 1 | 0 |
| 1 | 1 | 0 | 1 | 1 |
| 1 | 1 | 0 | 0 | 0 |

Fig. 4F

HARDWARE TRUE RANDOM NUMBER GENERATOR IN INTEGRATED CIRCUIT WITH TAMPER DETECTION

BACKGROUND

The present invention relates to methods and circuits for generating random numbers, and more particularly, methods and circuits for generating true random numbers in an Integrated Circuit (IC) with tamper detection.

Cryptographic applications often need a source of "true" random numbers, such as for generating keys, padding, or "seeding" messages and passwords. True random numbers, as opposed to computed pseudo-random numbers, are hard to generate, especially inside an IC. A true random number generator differs from a pseudo-random number generator in that the former is based on measuring inherently random, non-repeatable, natural artifacts, while the latter is a repeatable, mathematically computed number.

It is becoming more common to implement cryptographic applications in integrated circuits. When using cryptographic applications within an FPGA, random numbers can be generated inside or outside the integrated circuit. However, if random numbers are generated outside the integrated circuit, the cryptographic application is susceptible to attack by monitoring the integrated circuit interface.

Additionally, an integrated circuit using internal methods for generating random numbers is also susceptible to tampering if the method utilized is susceptible to changes in temperature, voltage supplies, or other environmental factors.

It is in this context that embodiments of the invention arise.

SUMMARY

Embodiments of the present invention provide methods and circuits for creating a True Random Number Generator (TRNG) with tamper-detection.

It should be appreciated that the present invention can be implemented in numerous ways, such as a process, an apparatus, a system, a device or a method on a computer readable medium. Several inventive embodiments of the present invention are described below.

In one embodiment, a method generates a True Random Number Generator (TRNG) with tamper detection in an Integrated Circuit (IC). The method includes creating two identical TRNGs circuits in the integrated circuit (IC) located in close proximity to each other. The method further checks for a correlation between the outputs generated by the two TRNGs. If the outputs are not correlated, then a combination of the outputs is produced, the combination being a true random number. Otherwise, that is, when the outputs are correlated, an error value is produced to signal potential tampering or other environmental circumstance that causes the two TRNGs to stop generating truly random numbers.

In another embodiment, a circuit, including two identical TRNG circuits together with logic circuitry, combines and correlates outputs of the two TRNG circuits. The two identical TRNG circuits are located in close proximity to each other inside an Integrated Circuit (IC). The logic circuitry analyzes the outputs of the two TRNG circuits, and the historical values of the relationship between the outputs of the two TRNG circuits, to determine if the outputs are correlated. If the outputs are not correlated, the logic circuitry outputs a true random number sequence based on the combination of the two TRNG circuits. As a result, circuit tampering, such as changes in temperature or voltage supplies, as well as environmental changes affecting random number generation are detected in the IC.

In another embodiment, the previously described circuit is implemented in a programmable logic device. Additionally, the logic circuitry includes a first logic gate to combine the outputs of the two TRNG circuits, a latch to store the output of the first logic gate, and a second logic gate that combines the outputs of the first logic gate and the latch.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 4A-F illustrate the behavior of the circuit of FIG. 3 under different scenarios.

DETAILED DESCRIPTION

The following embodiments describe circuits and methods to generate a True Random Number Generator (TRNG) with tamper-detection.

It will be obvious, however, to one skilled in the art, that the present invention may be practiced without some or all of these specific details. In other instances, well known process operations have not been described in detail in order not to unnecessarily obscure the present invention.

In one embodiment, a dedicated TRNG block is implemented in an IC. In another embodiment, the random number is generated based on the shot-noise across a resister, which is differentially amplified and sampled to produce a random 0 or 1 output signal. Two identical TRNG blocks in the IC are placed in close proximity to each other, and circuitry in the IC detects if the output of the two generators are mutually random (i.e. non-correlated).

Implementing a true random number generator in an integrated circuit or a programmable logic device, such as an FPGA is difficult, since there are no well-behaved random noise sources in the logic fabric. One way to approximate the TRNG in an integrated circuit is to use the metastability of latched-registers that occurs when the clock and data-in to a register change within a narrow window. However, this metastability window can vary with changes in the device voltage, device temperature, and electrical noise fluctuations. Typically, integrated circuit manufactures do not fully characterize, nor guarantee, the metastability phenomenon for use as a random-noise source. In fact, manufactures aim at avoiding metastability, often characterizing only those conditions in which metastability will not occur, rather than characterizing those conditions under which metastability is guaranteed to occur. As a result, creating a secure TRNG, using only programmable logic, is a challenge.

Figure 1:
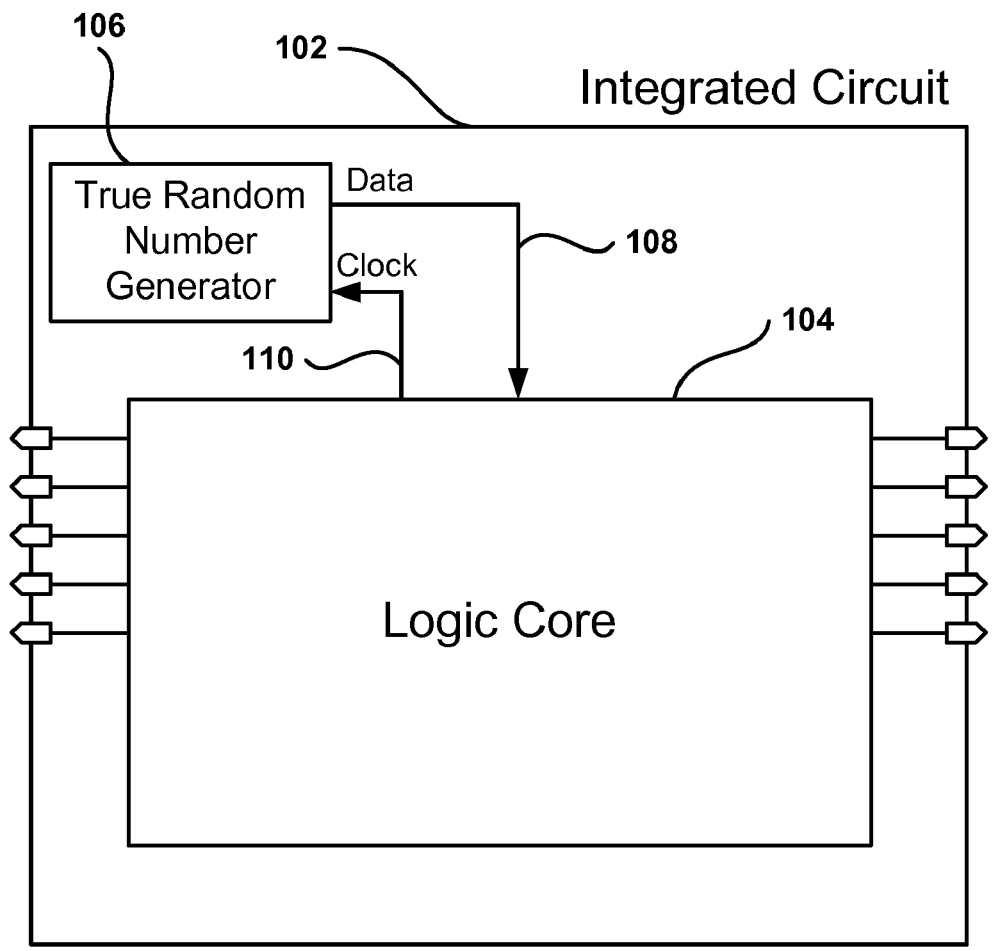
FIG. 1 shows a hardware TRNG incorporated into an IC, according to one embodiment.

FIG. 1 shows a hardware TRNG 106 incorporated into IC 102, according to one embodiment. TRNG 106 is located outside logic core 104 of IC 102. TRNG 106 receives clock input 110 from logic core 104 and generates random number stream 108, which is fed back to logic core 104 for use in different applications, such as creating cryptographic keys, as previously described.

Figure 2:
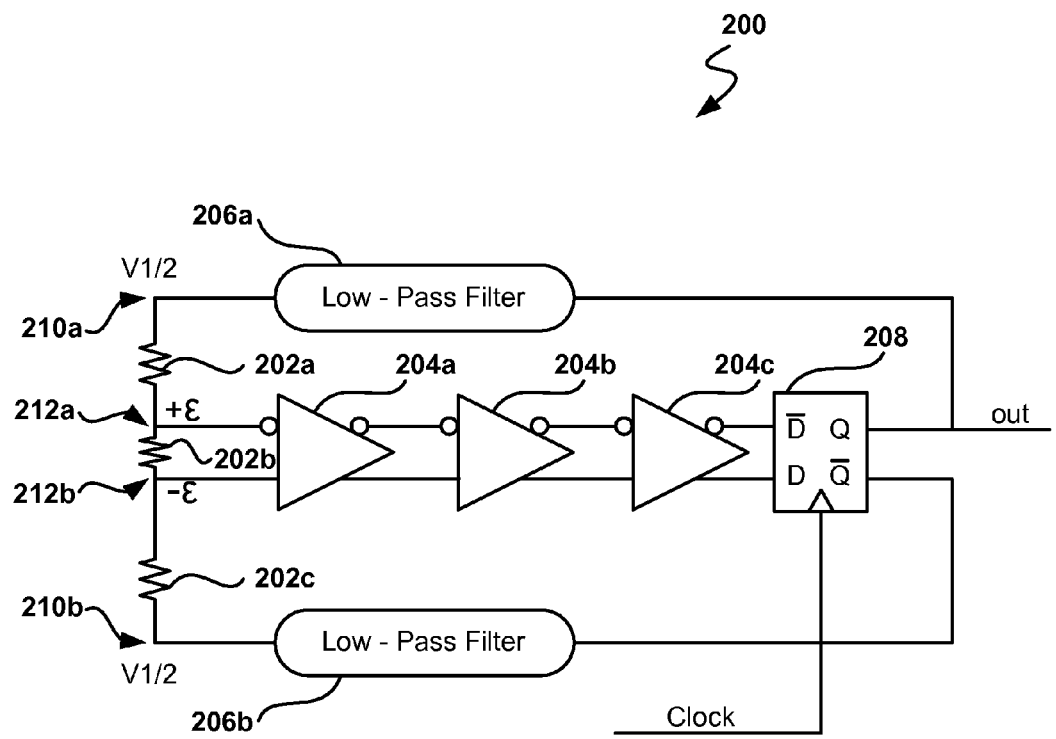
FIG. 2 depicts an embodiment for a TRNG circuit based on shot-noise across a resistor.

FIG. 2 depicts an embodiment for TRNG circuit 200 based on the shot-noise across a resistor 202b. Shot noise is a type of electronic noise that occurs when the finite number of particles that carry energy, such as electrons in an electronic circuit, is small enough to give rise to detectable statistical fluctuations in a measurement. Shot-noise across resistor 202b is differentially amplified and then digitized to output a logic value of 0 or 1. In one embodiment, the amplification of the voltage across resistor 202b is accomplished by three differential amplifiers 204a-c. While three amplifiers are shown in FIG. 3, any other number of amplifiers is possible in other embodiments, as long as the noise signal is subject to enough amplification to generate 0's and 1's at latch 208.

The output of differential amplifier 204c is digitally latched by a clock signal in latch register 208. The Q output of latched register 208 is passed through low pass filter 206a, and then fed back negatively to differential amplifier 202a. The $\overline{Q}$ output of latch 208 is fed via low pass filter 206b to another terminal of differential amplifier 204a. The amplification and the filtering are balanced in order to output an approximately equal number of 0's and 1's. It should be appreciated that the Q output of latch 208 is the output of TRNG circuit 200.

The filtering frequency of low-pass filters 206a-b is much smaller than the clock frequency in order to generate a voltage V1/2 which is about one half the value corresponding to a high voltage generated by latch 208. The latch generates about an equal number of 0's and 1's to force voltages V1/2 210a-b over time to stay at a level corresponding to one half of a logic high voltage. This is accomplished by feeding negatively Q and $\overline{Q}$ to differential amplifier 204a. In one embodiment, the low-pass filter frequency is 1/20 the clock frequency, but other values are also possible. Once the circuit is balanced, the voltage across terminals 212a-b of resistor 202b corresponds to small noise variations, which are amplified to generate the random number.

Figure 3:
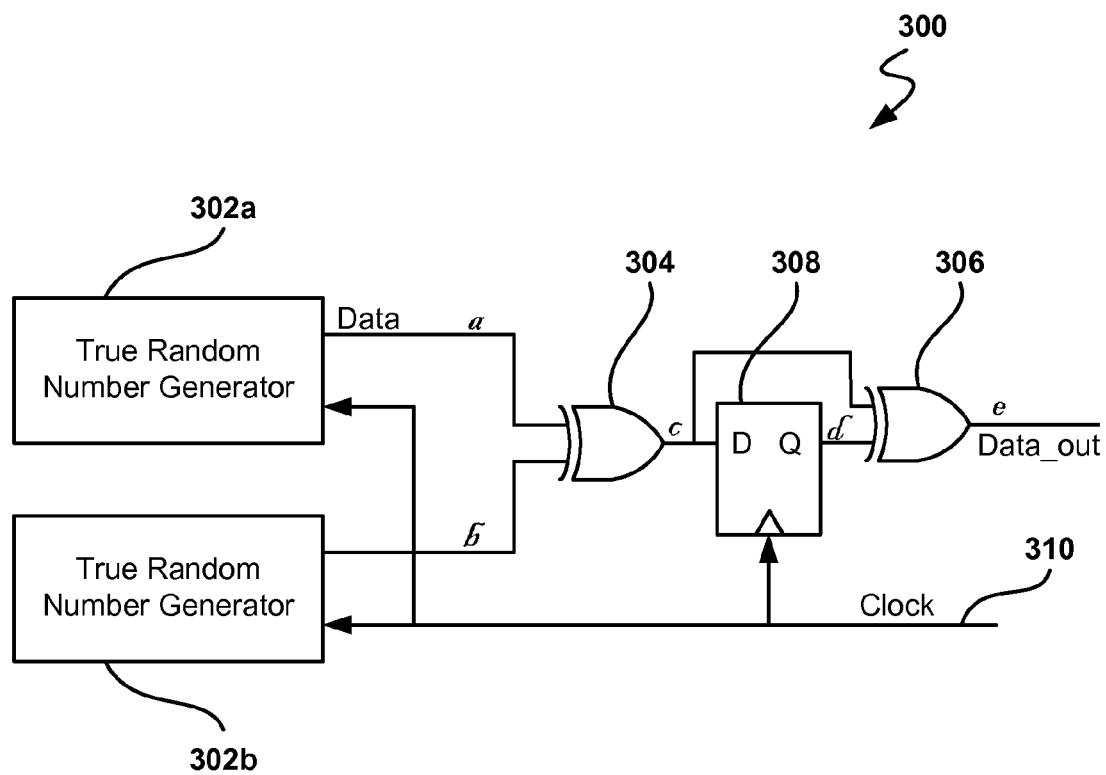
FIG. 3 illustrates a circuit combining the outputs of two identical TRNGs to generate a TRNG with tamper detection.

FIG. 3 illustrates a circuit combining the outputs of two identical TRNGs to generate a TRNG with tamper detection. Even though a balanced differential amplifier, such as the one in FIG. 2 including amplifiers 204a-c, is used to generate random numbers, it may still be possible for the random output of the amplifier to become temporarily non-random if the power to the amplifier is subjected to sudden changes in voltage, or if the device is subjected to sudden temperature changes. To detect if the TRNG becomes non-random, one embodiment uses a pair of identical random-number generators 302a-b located proximate to each other on the die and tied to the same power busses. Because random noise sources 302a-b are paired, an outside affect (such as a power surge) that affects one random number generator will likely affect the other as well. Thus, if the output of one random number generator is temporarily forced to a "0" (or to a "1"), the other random number generator will likely also be forced to a "0" (or to a "1"), respectively.

In one embodiment, both random number generators are sampled at the same time, and the output of the random generators is used if the sequence of bits appear to be relatively random. In one embodiment, the random noise source is sampled when one, but not both, of the digitized random noise sources makes a transition. If the resulting random noise source is random, but biased toward either 0 or 1, the result can easily be turned into a non-biased sequence of 0's and 1's by using well-known methods, such as by sampling sequential pairs of bits and outputting a "0" or "1" only when a "10" or "01" have occurred, and ignoring "00" and "11" sequences.

In one embodiment, when the outputs of both generators 302a-b are correlated, then output e of circuit 300 is 0. When the outputs are not correlated, e is a sequence of random numbers, signifying a non-correlated result.

Checking correlation in circuit 300 is obtained by the logic circuitry including logic gates 304 and 306 and latch 308. Any other circuit that determines the correlation between two inputs can be used, as long as the circuit conforms to the principles of the invention. Circuit 300 has latch 308 being used as a memory element. Since only one memory element is present, correlation is performed on sequences of two bits. Other embodiment includes additional memory elements, where correlation between the outputs of TRNGs 302a and 302b can be tested for longer sequences.

The logic circuitry has basically three stages. The first stage compares the outputs of the two TRNGs. The second stage stores the value of the comparison in stage 1, and the third stage compares the current output of stage 1 with the previous value obtained in stage 1 (read from the output of stage 2). In the embodiment of FIG. 3, exclusive OR logic gate 304 performs the comparison of outputs a and b from TRNGs 302a and 302b. The result of the exclusive OR operation from logic gate 304 is stored in latch 308. Finally, the second exclusive OR gate compares the output c from gate 304 and d from latch 308. This in fact compares the current value of c with the previous value of c.

The logic circuitry in circuit 300 is just one embodiment to check for correlation. Other logic circuitry may be utilized to perform the three-stage functionality described above, as FIG. 3 is exemplary and not meant to be limiting. The logic circuitry may be based on other types of logic gates like AND, OR, NOT, NXOR, NAND, NOR, etc. Further, in another embodiment, values from the outputs of the TRNGs are stored in memory elements, as opposed to monitoring the relationship between the outputs.

The concept of correlating random numbers created in similar environments can be expanded to more than two TRNGs. Other embodiments may use 3, 4, or even more TRNGs to check for non-randomness in the numbers generated.

FIGS. 4A-F illustrate the behavior of the circuit of FIG. 3 under different scenarios. In the scenario of FIG. 4A, both TRNG circuits have stopped producing random numbers and are just outputting a 0. As a result, c is always 0 (exclusive OR of a and b), and so is d (c delayed by one cycle). Output e is always 0 because e is the exclusive OR of c and d, both 0. Since e is always 0, this indicates that that the two TRNGs are correlated. In FIG. 4B, both TRNGs are producing a constant value of 1. The exclusive OR of two 1's is a 0, therefore c is always 0, and the remainder of FIG. 4B follows the same analysis as in FIG. 4A.

The scenario in FIG. 4C corresponds to a and b being always equal, although not constant as in FIG. 4A. This indicates correlation between the outputs, thus e should produce a constant value of 0 to indicate correlation. Since the exclusive OR of equal logic values is always a 0, c will always be a 0, causing e to also be always 0.

A scenario where a and b are negatively correlated is shown in FIG. 4D. In this case, b is the logical opposite of a. Because a and b are complementary, the exclusive OR of complementary values will always be a 1 (c). Since c is always a 1, then d is always a 1. The exclusive OR of two 1's is a 0, therefore e will always be a 0, indicating correlation.

FIG. 4E shows a scenario where a is not random, bur rather a constant value of 1. On the other hand, the second TRNG is producing a random sequence of values in b. Since an exclusive OR of a 1 with a logic value x always produces a logical value opposite of x as an output, c is always equal to not (b), making c also random. Since d is equal to c delayed by one clock cycle, then d is also random. Finally, e is also random because c and d are random and not correlated. In fact, e is obtained by comparing consecutive values of b, which are not correlated because b is random in this scenario.

FIG. 4F illustrates the scenario where a and b are both random, and it can readily be observed that output e is also random.

Figure 5:
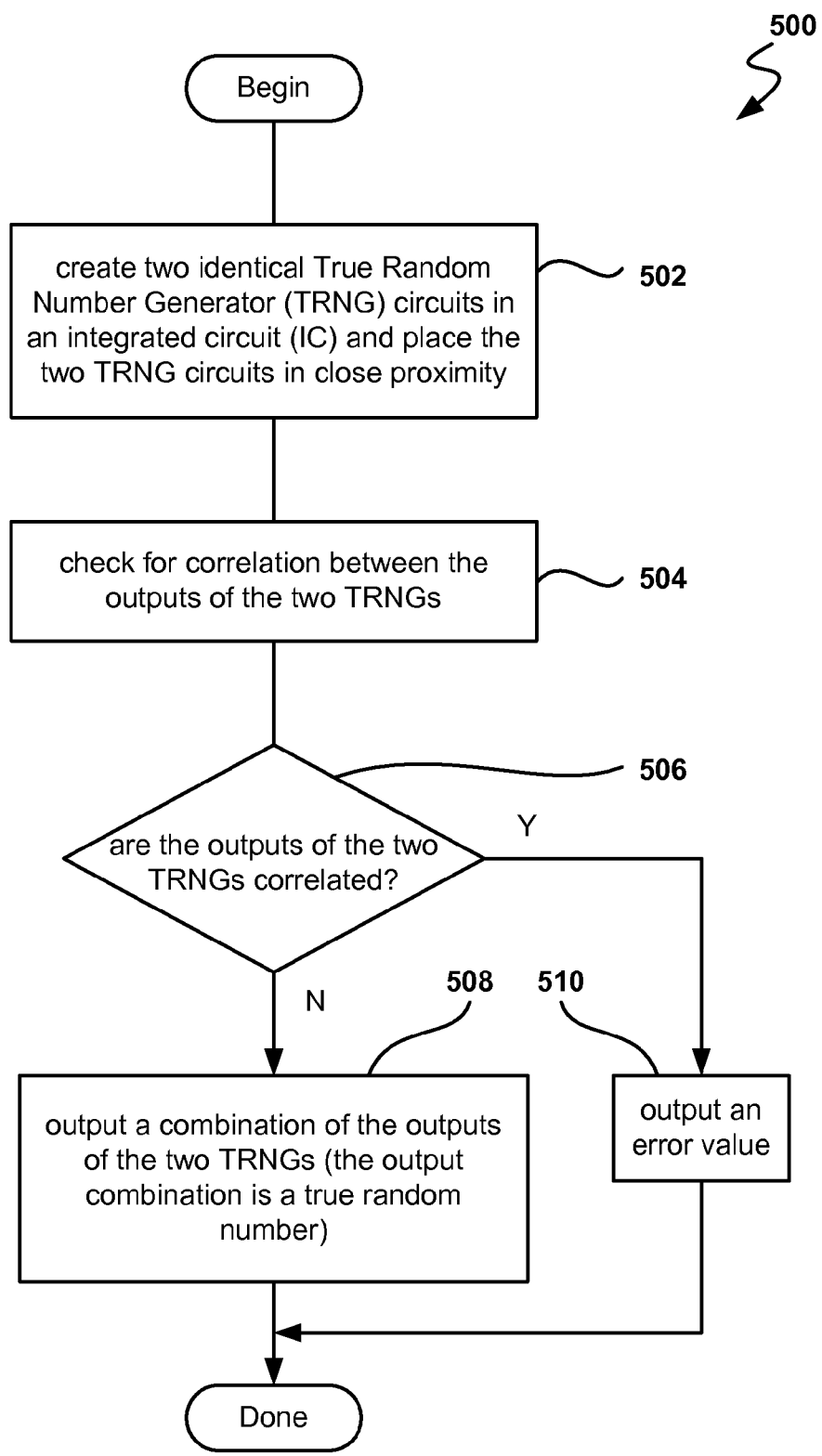
FIG. 5 shows the flow of an algorithm for generating a TRNG with tamper detection in an Integrated Circuit (IC), in accordance with one embodiment of the invention.

FIG. 5 shows the flow of an algorithm for generating a TRNG with tamper detection in an Integrated Circuit (IC), in accordance with one embodiment of the invention. In operation 502, the algorithm creates two identical True Random Number Generator (TRNG) circuits in an integrated circuit (IC) in close proximity of each other. In one embodiment, each TRNG circuit is the circuit previously presented in FIG. 2. In operation 504, the method checks for correlation between the outputs of the two identical TRNGs. The correlation is checked, according to one embodiment, by the circuit presented in FIG. 3, where the outputs of the two identical TRNGs are compared and the result stored in a latch. Further, the relationship between the outputs is compared to the relationship between the outputs in the previous cycle using the latch-stored value. If the outputs are correlated, the circuit of FIG. 3 will generate consecutive logic low values.

The result of operation 504 is used in operation 506 to branch to operation 508 if the outputs are not correlated, or to branch to operation 510 if the outputs are correlated. In operation 508, a random number is generated by outputting a combination of the numbers generated by the two TRNGs. Conversely, an error value is output in operation 510 to indicate that correlation was found between the outputs indicating possible tampering or other environmental conditions affecting the TRNG circuits.

The methods and circuits, for creating a True Random Number Generator (TRNG) with tamper detection, described herein may be incorporated into any suitable integrated circuit. For example, the method and system may be incorporated into other types of programmable logic devices such as programmable array logic (PAL), programmable logic array (PLA), field-programmable gate array (FPGA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to generate a True Random Number Generator (TRNG) with tamper detection in an Integrated Circuit (IC), the method comprising:
    providing two TRNG circuits in the integrated circuit (IC), the two TRNG circuits placed in close proximity;
    checking for correlation between outputs of the two TRNG circuits;
    outputting a combination of the outputs of the two TRNG circuits in response to the checking indicating that the outputs of the two TRNG circuits are not correlated, and wherein the combination of the outputs is a true random number; and
    outputting an error value when the checking indicates that the two TRNG circuits are correlated, wherein at least one method operation is executed through a processor.

2. The method of claim 1, wherein the error value is generated in response to the outputs of the two TRNG circuits being equal or in response to the outputs of the two TRNG circuits being opposite.

3. The method of claim 1, wherein the two TRNG circuits generate random numbers based on an amplified noise across a resistor.

4. The method of claim 1, wherein checking for correlation further includes:
    combining outputs from the two TRNG circuits to generate a first logical value;
    comparing the first logical value with historical values, the historical values corresponding to previously obtained first logical value; and
    indicating that the outputs of the two TRNG circuits are not correlated when in response to the comparing of the first logical value indicating that the first logical value is not correlated with the historical values.

5. The method of claim 4, wherein a latch is used to store a previously obtained first logical value, wherein the previously obtained first logical value corresponds to a first logical value obtained in a clock cycle prior to a clock cycle where the first logical value is obtained.

6. The method of claim 1, further including;
    removing bias from the combination of the outputs.

7. A circuit to generate a True Random Number Generator (TRNG) with tamper-detection, the circuit comprising:
    a first TRNG circuit;
    a second TRNG circuit in close proximity to the first TRNG circuit; and
    logic circuitry operable to analyze outputs of the first and second TRNG circuits and historical values of a relation between the outputs of the first and second TRNG circuits to determine if the outputs of the first and second TRNG circuits are correlated, wherein the logic circuitry outputs a constant logic value in response to the outputs of the first and second TRNG circuits being correlated, wherein the logic circuitry outputs a true random number in response to the outputs of the first and second TRNG circuits being uncorrelated; and wherein the circuit to generate a TRNG is located in an Integrated Circuit (IC).

8. The circuit of claim 7, wherein the first TRNG circuit includes:
a resistor; and
a latch operable to receive an amplified voltage between a first terminal and a second terminal of the resistor,
wherein opposite logic outputs of the latch are fed back negatively to the first and second terminals of the resistor.

9. The circuit of claim 8, wherein the first TRNG circuit further includes;
a first low-pass filter in electrical communication with a first logic output of the latch and the first terminal of the resistor, and
a second low-pass filter in electrical communication with a complementary signal of the first logic output of the latch and the second terminal of the resistor,
wherein voltages at outputs of the first and second low-pass filters are equal to one half of a voltage corresponding to a logic high at the latch.

10. The circuit of claim 9, wherein the first low-pass filter and the second low-pass filter operate at a frequency twenty times lower than a clock frequency.

11. The circuit of claim 8, wherein the first TRNG circuit further includes a multi-level balanced differential amplifier operable to generate the amplified voltage.

12. The circuit of claim 8, wherein the amplified voltage between the first and second terminals of the resistor corresponds to a shot-noise across the resistor.

13. The circuit of claim 7, wherein the logic circuitry further includes;
a first exclusive OR logic gate operable to compare outputs of the first and second TRNG circuits,
a memory element operable to store an output of the first exclusive OR logic gate, and
a second exclusive OR logic gate operable to compare an output of the first exclusive OR logic gate with a content of the memory element.

14. The circuit of claim 13, wherein the memory element includes a latch.

15. The circuit of claim 7, wherein the IC is a Field-Programmable Gate Array (FPGA).

16. A circuit operable to generate a True Random Number Generator (TRNG) with tamper-detection, the circuit comprising:
a first TRNG circuit;
a second TRNG circuit proximate to the first TRNG circuit;
a first logic gate combining outputs of the first and the second TRNG circuits;
a latch operable to store an output of the first logic gate; and
a second logic gate operable to combine outputs of the first logic gate and the latch,
wherein the second logic gate outputs a constant logic value in response to outputs of the first and the second TRNG circuits being correlated, and
wherein the second logic circuitry outputs a true random number in response to outputs of the first and the second TRNG circuits being uncorrelated.

17. The circuit of claim 16,
wherein the first logic gate is an exclusive OR gate,
and wherein the second logic gate is an exclusive OR gate.

18. The circuit of claim 16, wherein the circuit is located in one of an Input/Output block of a Field-Programmable Gate Array (FPGA) or a control block of the FPGA.

19. The circuit of claim 16, wherein the first TRNG circuit is based on an amplified noise over a resistor with a voltage that is balanced across terminals of the resistor.

20. The circuit of claim 19, wherein the terminals of the resistor are in electrical communication with a voltage equal to one half of a voltage corresponding to a logic high.

* * * * *